United States Patent
Ludewig, Jr. et al.

[15] 3,678,487
[45] July 18, 1972

[54] MULTI-ZONE INCIPIENT OR ACTUAL FIRE AND/OR DANGEROUS GAS DETECTION SYSTEM

[72] Inventors: Frederick A. Ludewig, Jr., Ballston Spa; Frank W. Van Luik, Jr., Schenectady, both of N.Y.

[73] Assignee: Environment/One Corporation, Schenectady, N.Y.

[22] Filed: Feb. 8, 1971

[21] Appl. No.: 113,284

[52] U.S. Cl................................340/236, 73/432 PS, 356/37
[51] Int. Cl. .........................................................G08b 19/00
[58] Field of Search....................73/23, 29, 432 PS; 235/151, 235/151.3, 151.34; 340/236; 356/37

[56] References Cited

UNITED STATES PATENTS

| | | | |
|---|---|---|---|
| 3,588,481 | 6/1971 | Stroman | 235/151.34 |
| 3,618,061 | 11/1971 | Livers | 340/236 |

*Primary Examiner*—Donald J. Yusko
*Attorney*—Charles W. Helzer

[57] ABSTRACT

A multi-zone detecting system for incipient or actual fires and/or dangerous gas accumulations comprising a multi-zone sampling system for obtaining samples of the atmosphere of the respective zones being monitored and supplying the same to a common sampling station. The sample gases are continuously drawn off and supplied through a rotary selector valve sequentially to the input of a common condensation nuclei particle detector located at the common sampling station. The sensitivity of the condensation nuclei detector is individually adjusted in synchronism with the operation of the rotary selector valve to adjust the sensitivity of the condensation nuclei detector to the individual background conditions existing in each zone being monitored as the detector is sequentially switched from one zone to the next. The sensitivity of the common condensation nuclei detector is decreased for a predetermined short time settling interval following each sequential switching operation prior to making a measurement with respect to the sample atmosphere of the new zone to which it is switched. A gas conversion device can be interposed in the input to the common condensation nuclei detector for converting certain dangerous gases that might be entrained in the sample atmospheres from the several zones into condensation nuclei for supply and analysis by the condensation nuclei detector. With such an arrangement, the concentration of condensation nuclei particles detected would be in proportion to the dangerous gas constituency of the sample atmospheres. A continuous flow sample system provides a relatively fast responding detection of the occurrence of an alarm condition in any of the several zones being monitored. Additional advantageous features are described.

34 Claims, 3 Drawing Figures

INVENTORS
FREDERICK A. LUDEWIG, JR
FRANK W. VAN LUIK, JR.

BY Charles W Helzer

ATTORNEY

INVENTORS
FREDERICK A. LUDEWIG, JR
FRANK W. VAN LUIK, JR.

BY Charles W Helzer

ATTORNEY

MULTI-ZONE INCIPIENT OR ACTUAL FIRE AND/OR DANGEROUS GAS DETECTION SYSTEM

BACKGROUND OF INVENTION

1. Field Of Invention

This invention relates to a new and improved multi-zone incipient or actual fire and/or dangerous gas detection system.

More specifically, the invention relates to a multi-zone incipient or actual fire detection system employing a condensation nuclei particle detector as the sensor device, and which can be readily adapted also to detect accumulations above a certain safe level of certain dangerous gases (such as combustible hydrocarbon gases), and to signal the existence of such incipient or actual fire or accumulation of dangerous gases to a central monitoring point, fire protection agency, or the like.

2. Background of Invention

In large multi-floor buildings, manufacturing facilities having different manufacturing areas, warehouse storage facilities, and the like, the provision of suitable automatically operating fire detection equipment has been a continuing problem. In such multi-station or multi-zone facilities, the provision of suitable, economically feasible, and sufficiently sensitive fire detection protection becomes a problem because of the differing characteristics of the many different zones of the facility or area to be protected. Most of the known multi-zone fire detection systems employ a plurality of sensors with at least one (and sometimes even more) sensors being provided for each zone to be protected. In such arrangements, the use of extremely sensitive sensor devices becomes prohibitive due to escalating costs. Hence, the provision of satisfactory multi-zone, automatically operating fire protection equipment thus far has been restricted to only a few facilities where the extremely high cost of such a system is justified by the need for the improved protection. To overcome this problem and to provide a relatively low cost, extremely sensitive fire and/or gas accumulation detection system for multi-zone facilities wherein each of the different zones being protected presents different background condition with respect to which the sensor must operate, the present invention was devised.

SUMMARY OF INVENTION

It is therefor a primary object of the invention to provide a new and improved multi-zone incipient or actual fire and/or dangerous gas detection system capable of use in multi-zone facilities wherein the several zones being protected have different background characteristics.

Another object of the invention is to provide such a system which employs a single, common, highly sensitive condensation nuclei particle detector as the sensing device of the detection system, and which sequentially is applied to monitor the atmospheres of the several different zones of a multi-zone facility. For this purpose a relatively low cost piping system and sequentially operated selector valve assembly is used to gather atmospheric samples from each of the several zones being monitored, and supplies the sample atmospheres sequentially to the common condensation nuclei detector. To overcome the problem of different background levels of activity or other factors affecting background conditions in each of the several zones being protected, the sensitivity of the condensation nuclei detector is individually adjusted in synchronism with the switching of the detector to analyze samples of the respective zones by the selector valve assembly in a manner so as to compensate for the different background conditions of each of the respective zones being monitored.

Another object of the invention is to provide a detection system having the above characteristics wherein samples of the atmospheres of the respective zones being monitored are drawn off continuously and are sequentially sampled-on-the-fly by the central selector valve assembly, and supplied to the common condensation nuclei detector for measurement. As a result, the system is made to be relatively fast responding to the occurrence of an alarm condition in any of the zones being monitored.

In practicing the invention, a multi-zone detecting method and system is provided for monitoring a plurality of different zones for the detection of incipient or actual fires and/or dangerous gas accumulation. In this system samples of the atmosphere of each zone being monitored are continuously drawn off and sequentially supplied to a common measuring station. At the common measuring station the sequentially supplied samples are analyzed by a condensation nuclei detector which signals the existence of an alarm condition in any of the zones being monitored. To provide for different background conditions in the several zones being protected, the sensitivity of the common condensation nuclei detector is individually adjusted sequentially in synchronization with the supply of the sample atmospheres as measurement is switched from one zone to another in order to accommodate the individual background conditions existing in each zone to be monitored. Additionally, the common condensation nuclei detector is in effect desensitized for a short duration settling period following each sequential switching of a sample atmosphere being measured whereby the condensation nuclei detector will have the sample of a previous zone cleared out and be conditioned to respond only to the newly supplied sample atmosphere. By including gas conversion devices in the input to the condensation nuclei detector through which the sample atmospheres are caused to pass, the system can be made to respond to accumulations of certain gases above a desired level within any of the respective zones being monitored.

It is preferred that the sample atmospheres from all of the zones being monitored, be drawn off continuously and supplied to the common sample measurement station where they are sequentially accessed on-the-fly and measured in a predetermined sequential order so as to improve the response time of the monitoring method and system to an alarm condition occuring in any of the zones being monitored. By providing a centrally located, common selector valve assembly for sequentially supplying the sample atmospheres to the common condensation nuclei detector, separate adjustment of the flow rates of the respective sample atmosphere can be readily accomplished to thereby accommodate differences in length of piping systems, different diameters, etc and maintain a balanced flow rate from all of the zones being monitored to the central condensation nuclei detector. Additionally, by appropriate design of the centrally located selector valve assembly, the sampling rate and/or the duration of sampling of certain zones with respect to others can be readily modified to accommodate the requirements of particular installations. An additional feature, is the provision of means for adjusting the sensitivity of the sample measurements in accordance with the time of day and nature of operation being conducted in the respective zones where such operations, level of activity, etc change in accordance with the time of day.

A further desirable feature is the provision of fail-safe relay operated indicating means for each of the several zones being monitored by the detecting system for indicating the existence of an alarm condition in any of the zones being monitored in a fail-safe manner; the provision of a fail-safe malfunction detector responsive to the output from the common condensation nuclei detector for indicating the existence of a malfunction condition in a fail-safe manner; and, the use of a highly sensitive, single common condensation nuclei detector as the sensing device and which has only relatively small electric power requirements whereby the entire detection system can be operated on standby battery power during emergency periods of power failure.

BRIEF DESCRIPTION OF DRAWINGS

These and other objects, features and many of the attendant advantages of this invention will be appreciated more readily as the same becomes better understoody by reference to the following detailed description when considered in connection with the accompanying drawings, wherein like parts in each of the several figures are identified by the same reference character, and wherein.

DETAILED DESCRIPTION OF PREFERRED EMBODIMENTS

Figure 1:
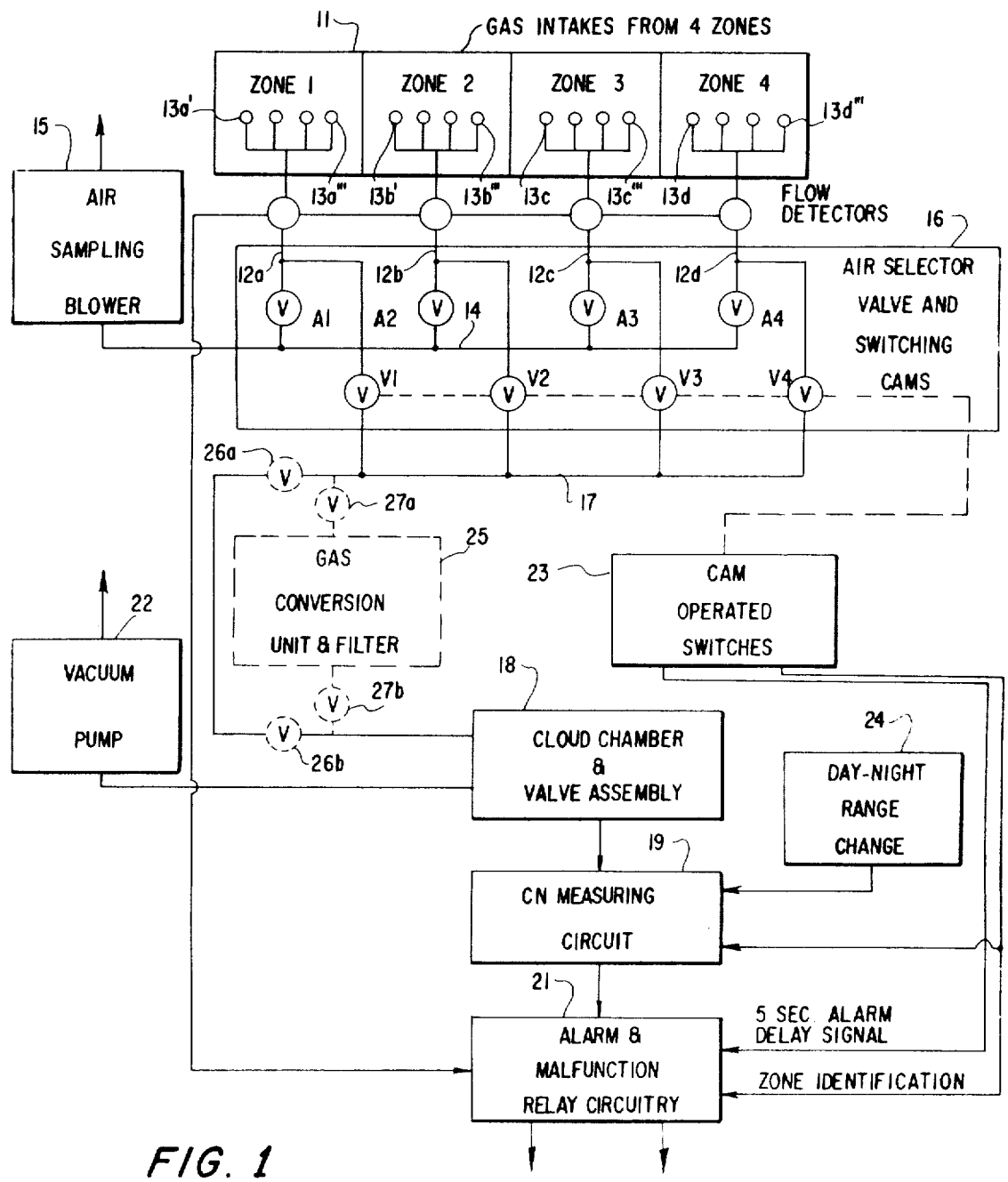
FIG. 1 is a functional block diagram of an overall fire and/or gas detector constructed in accordance with the invention.

FIG. 1 is a functional block diagram of a new and improved multi-zone incipient or actual fire and/or dangerous gas detection system. The system is designed to provide fire and dangerous gas protection for multi-zone area such as that indicated at 11 in FIG. 1. The multi-zone area 11 may comprise a warehouse having different storage rooms, a manufacturing facility having different operations carried out in different rooms, a multi-story, multi-room high rise apartment or office building, a school building, or other similar installation having a plurality of zones indicated as zones 1–4. The invention is in no way restricted to employment with only four zones but may be expanded or contracted to accommodate any desired number of zones by appropriate design of the sampling system (as described hereinafter to accommodate the particular number of zones to be protected. Each zone of the overall area or facility 11 to be monitored in turn may be broken down into a plurality of sampling areas. For example, there may be four sampling areas for each zone as shown in FIG. 1. With such an arrangement, each sampling area of a particular zone could correspond to an office suite with all of the office suites on a particular floor of a multi-floor building being combined together into one zone, and with the remaining floors comprising the remaining zones to be monitored. Other similar arrangements for warehouses, manufacturing facilities, school buildings, and the like will be suggested to those skilled in the art.

In order to monitor each of the zones 1–4, a sampling system is provided which is comprised by a plurality of main sampling system conduits 12a–12d for each of the zones 1–4, respectively. The conduits 12a–12d may be formed from aluminum copper, galvinized steel, plastic or any known suitable piping for physically transporting sample gases from the atmospheres in each of the zones to a commonly located detector to be described hereinafter. For this purpose, each of the conduits 12a–12d are connected to header or manifold ducts that in turn are connected through a plurality of branch conduits and intake heads 13a–13d''' to sample the several respective sampling areas within a particular zone. It is preferable that the individual intake heads 13 for each sampling area be provided with a flow adjusting valve for balancing the flow from all of the branch conduits into the main conduit for the zone, such as 12a for example, whereby representative sample of all of the areas within a zone being monitored, is assured. Additionally, the intake heads 13 may be different in size to accommodate particular installation requirements.

To provide for a positive flow of sample gases from the intake heads 13a–13d''', all of the main sample conduits 12a–12 are connected to a main common exhaust conduit 14 that is exhausted through an air sampling blower 15 such as a centrifigal fan of conventional construction for exhausting the sample gases out into the atmosphere. Flow into the main exhaust conduit 14 place through respective ones of a plurality of low adjusting valves A1, A2, A3 and A4 for each of the respective zones 1–4. The flow adjusting valves A1–A4 are all mounted at a common location and comprise a part of a rotary valve assembly 16 which preferably is of the type described in copending United States patent application Ser. No. 113,258 entitled — Fluid Sampling Valve by Frederick A. Ludewig, Jr., inventor filed Feb. 8, 1971 concurrently with this application and assigned to the Environment/One Corporation.

The flow adjusting valves A1-A4 provide centrally disposed, easily accessible means for adjusting the flow through each of the main sampling conduits 12a–12d in a manner such that flow from all of the zones is balanced. That is, by restricting the flow through 12a, which for example may involve only a short run of conduit, the flow through this supply conduit can be made to equal that through 12d, for example, which may be longer in length or a smaller diameter pipe due to the requirements of the particular zones in which the sampling system is installed. As a result of this arrangement, a continuous, balanced and substantially equal flow can be made to take place through all of the main supply conduits 12a–12d or a specific flow inbalance to achieve the desired response times, by means of the respective zone flow adjusting valves A1–A4. This flow is drawn through the main exhaust conduit 14 out through the blower 15 in a continuous manner whereby the atmosphere of all the protected areas of each zone being monitored are continuously supplied to a central location where they can be sampled and monitored.

Samples of the atmospheres from each of the zones 1–4 selectively are obtained through respective ones of a plurality of selector valves V1–V4 comprising a part of the selector valve assembly 16. The selector valves V1–V4 sequentially are opened to draw off on-the-fly portions of the sample atmospheres flowing in each of the main sample conduits 12a–12d, and selectively supply each of the respective samples through a main or common supply conduit 17 to the input of a common, highly sensitive detector. The common, highly sensitive detector preferably comprises a condensation nuclei monitor having an input humidifier, cloud chamber and valve assembly 18. The humidifier, cloud chamber and valve assembly 18 serve to humidify and expand the sample atmospheres supplied selectively through the respective selector valves V1–V4 and common main 17 to a suitable degree of super saturation to cause water droplet formation about condensation nuclei particles entrained in the sample atmospheres as centers of water droplet growth. The resultant cloud of water droplets produces a scattering effect on a light beam measuring circuit 19 that in turn can activate the alarm and malfunction relay circuitry 21. The common, condensation nuclei detector comprised by cloud chamber 18 and the measuring circuit 19 may be of the type disclosed in U.S. Pat. No. 2,684,008, issued July 20, 1954 or in U.S. Pat. No. 336,210 issued Jan. 4, 1972. However, the measuring circuit 19 preferably comprises an improved measuring circuit disclosed in copending United States patent application Ser. No. 113,561 filed Feb. 8, 1971 entitled - Improved Condensation Nuclei Monitor Measuring Circuit, George F.Skala, Inventor filed concurrently with this application, and assigned to the Environment/One Corporation.

For a more detailed description of the construction and operation of the condensation nuclei cloud chamber and valve assembly 18 and measuring circuit 19, reference is made to the above-identified issued U.S. patent and copending applications. Briefly, however, the cloud chamber and valve assembly 18 first causes the sample gaseous atmospheres supplied from the respective selector valves V1–V4 to be humidified to substantially 100 percent relative humidity in a suitable humidifying device. The humidified sample gaseous atmosphere then is supplied to an expansion chamber where it suddenly is expanded to cause condensation of water droplets about nuclei particles entrained in the gaseous atmospheres as centers of condensation. The cloud of water droplets thus formed then is measured by a suitable light beam-photo cell arrangement which measures the amount of light scattered by the cloud formation of water droplets. Since the number of water droplets formed will be determined by the number or concentration of condensaion nuclei particles entrained in the sample gaseous atmospheres, the amount of light scattered by the cloud formation will be proportional to the particle concentration. The proportional output signal derived by the condensation nuclei measuring circuit 19 then is employed to operate the alarm and malfunction relay circuitry 21 in a manner to be described more fully hereinafter in connection with FIG. 2 of the drawings. In order to cause a positive flow of the sample gases through the humidifier cloud chamber and valve assembly 18, a vacuum pump 22 is employed in a known manner.

In operation, the air selector valve assembly 16 and air sampling blower 15 provide continuous air flow from all sampling areas through intakes 13 of all four zones of the facility 11 being monitored. Balanced flow from all sampling areas in each zone is provided by intakes 13 and the zone air flow adjusting valves A1–A4 provide means to equalize the flow from all zones to accommodate different pressure drops due to differing tube lengths and/or tube diameters that comprise the supply conduits 12a–12d. The selector valves V1–V4 are normally closed and are automatically sequentially opened one at a time by a motor driven cam assembly comprising a part of rotary selector valve assembly 16 that also operates a plurality of cam operated switches 23. The cam operated switches 23 condition the CN measuring circuit 19 and alarm and malfunction relay circuitry 21 for operation in connection with the respective samples from each of the zones. With this arrangement, as a particular selector valve (such as V1) selectively is opened to allow a sample from its zone (zone 1) to be drawn into the humidifier, cloud chamber and valve assembly 18, an associated cam operated switch 23 will appropriately adjust the sensitivity of the CN measuring circuit 19 and alarm and malfunction relay circuitry 21 to condition these circuits for the individual background conditions existing in the zone being sampled (zone 1). Each of the remaining selector valves V2–V4 and their associated cam operated switches 23 function in a similar manner upon the automatic sequential sampling of each of the remaining zones.

It is now a well known fact that fire and other combustion processes leading up the break out of an open flame, produces large quantities of condensation nuclei particles. The production of such large quantities of condensation nuclei particles takes place well in advance of even the occurrence of smoke so that by sensing these small condensation nuclei particles, an incipient fire can be detected often in advance of the breakout of an open flame. With the present system due to the continuous on-the-fly sampling of the continuously flowing samples drawn off from the atmospheres of each of the zones 1–4 being protected, and due to the fast responding, highly sensitive measurement of the condensation nuclei particle count in the sample atmospheres, fast sampling rates of even large multi-zone facilities can be provided, and incipient and/or actual fire occurring in any part of the zones being monitored can be detected and signaled to a central monitoring agency such as a local fire department within seconds of the development of an alarm condition.

It is now well known that the condensation nuclei detector is a highly sensitive, fast responding instrument which can detect extremely small condensation nuclei particles in the air even in very low concentrations within milliseconds. In the present system, the time limitation on sampling rate is introduced primarily by the sampling system. With the continuously flowing sample system described above, using ½ inch diameter tubing and a commercially available blower fan 15 capable of drawing about 15 inches of water, sample atmospheres from even the most remote zone of a large multi-zone facility can be transported to the centrally located sampling valve assembly 16 within about 30 seconds. Because of the short run from the rotary sample valve 16 to cloud chamber and valve assembly 18, and the fast response of the condensation nuclei monitor, no more than 2 seconds are required to monitor a selected sample supplied from valve 16. Thus, with a four zone system, each zone can be monitored every 8 or 10 seconds so that an alarm condition can be sensed and signalled within no more than 40 seconds of its occurrence anywhere within the four zone facility being protected.

In any practical installation with which the present detection system is employed, the background conditions in each of the zones will vary, sometimes quite widely. For example, consider that zones 1, 3 and 4 are made up primarily of classrooms on different floors of a multi-level school building. Then consider that zone 2 is comprised of the furnace room in which the boiler heating the school is located. Because of the different characteristics of the two zones, the normal or background level of condensation nuclei particles entrained in the atmosphere of zone 2 where the furnace is located will be substantially higher (greater concentration of condensation nuclei particles) due to the combustion processes taking place in the furnace and leakage outside the furnace lining. In normal classroom activities, no such high background level of condensation nuclei particles will be produced by the activities undertaken in the classrooms. This is particularly true of study rooms. However, with respect to laboratories, the background activity again may be much higher than that encountered in an average study classroom. Accordingly, some means must be provided for adjusting the sensitivity of the common, condensation nuclei detector measuring circuit 19 and alarm and malfunction relay circuitry 21, as the condensation nuclei detector is switched from one zone (such as zone 1) to the next zone (zone 2) for monitoring purposes. To provide such adjustment the cam operated switches 23 supply zone identification signals to both the CN measuring circuit 19 and the alarm and malfunction relay circuitry 21 to condition these circuits for operation in conjunction with the background conditions existing in a particular zone being monitored at that point in time by the condensation nuclei detector.

In addition to the above factors it can be appreciated that the background condensation nuclei particles produced in a classroom during daytime with students present in the room generally will be considerably higher than will be produced with no humans present in the room being monitored. Because of this time-dictated difference in background level in activity, a day-night range change circuit feature indicated at 24 is provided for again changing the sensitivity of the CN measuring circuit 19 for different time periods occurring over a normal 24 hour time period. The manner in which this adjustment is accomplished will be appreciated more fully hereinafter following a description of FIG. 2.

In addition to use as an incipient or actual fire detector, the system of FIG. 1 also can be employed to detect accumulations of dangerous gases, such as combustible hydrocarbon gases and the like, by suitable modification to include a filter and gas conversion unit shown at 25 in the input to the humidifier, cloud chamber and valve assembly 18. For this purpose, cut-off valves shown at 26a and 26b and bypass valves shown at 27a and 27b may be included in the common, main supply conduit 17 on the input of the cloud chamber and valve assembly 18. By closing the cut-off valves 26a and 26b and opening the bypass valves 27a and 27b, the filter and gas conversion unit 25 may be included in the detection system for monitoring the several zones being protected for the presence of accumulation above a preset level of certain known dangerous gases such as combustible hydrocarbon gases. The gas conversion unit 25 may comprise any known gas conversion unit such as are described in US Pat. No. 3,204,449, issued Sept. 14, 1965 F.W. Van Luik, Jr., Inventor — "Detection and Measurement Of Organic Vapors And Gases;" the "Process And Apparatus For Detecting Gas" described in U.S. Pat. No. 3,198,721 issued Aug. 3, 1965 to T.A. Rich; U.S. Pat. No. 3,117,841 — F.W. Van Luik, Jr. et al inventor issued Jan. 14, 1964 for "Method and Apparatus For Detecting Gases Or Vapors;" U.S. Pat. No. 3,094,392 — G.F. Skala Inventor — issued June 18, 1963 for "Gas Detection;" or patent number 2,897,059 issued July 28, 1959 - F.W. Van Luik, Jr., inventor "Process And Apparatus For Gas Detection."

If desired, the system can be modified so that the gas conversion unit 25 automatically is inserted in the sample flow portion of the system sequentially as each zone is sampled and measured. With such modification, during each zone measurement interval, the zone first is monitored for incipient or actual fire conditions and then sequentially is measured for the existence of undesired gas accumulations before switching the monitor to the next zone. For this purpose the cam design of the air selector valve and switching cam of selector valve assembly 16 would be appropriately modified to provide for automatic and sequential actuation of the cut-off and by pass valves 26a, 26b, 27a, 27b in addition to valves V1–V4. Because, the air selector valve and switching cam assembly 16 is a centrally located unit along with the centrally located, condensation nuclei detector assembly 18 and 19 and alarm and malfunction relay circuitry 21, such modification of the cam design to include automatic gas sensing readily can be accomplished. Additionally, if due to the nature of one of the zones it should be monitored more frequently or for longer periods than other zones, the cam design readily can be modified to provide a higher rate of sampling of the atmosphere of the particular zone, or an extended sampling period of the zone relative to the sampling periods of the other zones. Because of the central location and easy accessibility of the air selector valve and switching cam assembly 16, such modification to accommodate the needs of the particular installation readily can be accomplished.

From the preceding discussion it will be appreciated that irrespective of whether the condensation nuclei particles are supplied directly from the zones being monitored through the respective selector valves V1–V4 and valve 26a, 26b, or alternatively are produced in the gas conversion unit 25, they will be detected in the cloud chamber and valve assembly 18 and readout by the measuring circuit 19. When the output signal from the measuring circuit 19 exceeds a preset maximum reference value, a relay for the particular zone in question will be deenergized causing an alarm signal to be initiated. Additionally, should the readout from CN measuring circuit drop below a preset minimum value, a malfunction relay will become deenergized and cause an alarm signal to be initiated. For this purpose fail-safe relay actuated alarms for both the zone indicators and the malfunction indication, are employed.

The cams that operate the selector valves V1–V4 and respective cam operated switches 23 for each of the zones 1–4 also allows the proper zone alarm relay to become deenergized when an alarm condition is signaled. In addition, the cam operated switches 23 provide a momentary desensitization of the alarm and malfunction relay circuitry 21 during the interval of switching from one zone to another. This desensitization which may occur for example, over a five second, adjustable delay period before an alarm condition can be signaled by any of the zone indicators immediately after switching the input of the CN monitor to a new zone. This provides adequate time for flushing out the sample from a previous (perhaps dirtier and hence higher background particle count) zone before accepting an alarm condition signal from the next succeeding zone being currently sampled which may have a lower background particle count due to cleaner conditions. Thus, for example, as one switches from zone 2 which may be a furnace room having a high condensation nuclei particle background count to zone 3 which may be a relatively clean classroom area, it normally would be expected that zone 3 would have a considerably lower background condensation nuclei particle count. For this reason, the above mentioned change in sensitivity of the CN measuring circuit 19 is required as monitoring proceeds from one zone to the next; however, in addition to the delay period before enabling the zone 3 alarm indicator, is required in order to allow time for the higher background count zone 2 sample to be completely flushed out before allowing an alarm condition to be signaled by the new adjustment in sensitivity to accommodate background conditions in zone 3.

The output of both the zone alarm and the malfunction relay circuitry is a separate relay closure for either zone alarm or a malfunction condition. Since fail-safe (normally energized) relays are employed, contact closure occurs upon the relay dropping out for either an alarm of malfunction condition (such as loss of power supply) although the two conditions are separately read out. The contact closure can be used to initiate remote as well as local alarm devices such as lights, bells, sirens or telephone dialers for dialing a message to the local fire department, etc.

In addition to the above listed features, flow detectors such as indicated at 28a, 28b, 28c and 28d may be included in each of the zone sample supply conduits 12a–12d, respectively, for sensing the flow in each respective supply conduit. With this arrangement should the sample flow from a given zone drop below a present value, a malfunction condition would be signaled for that particular zone.

Figure 2A:
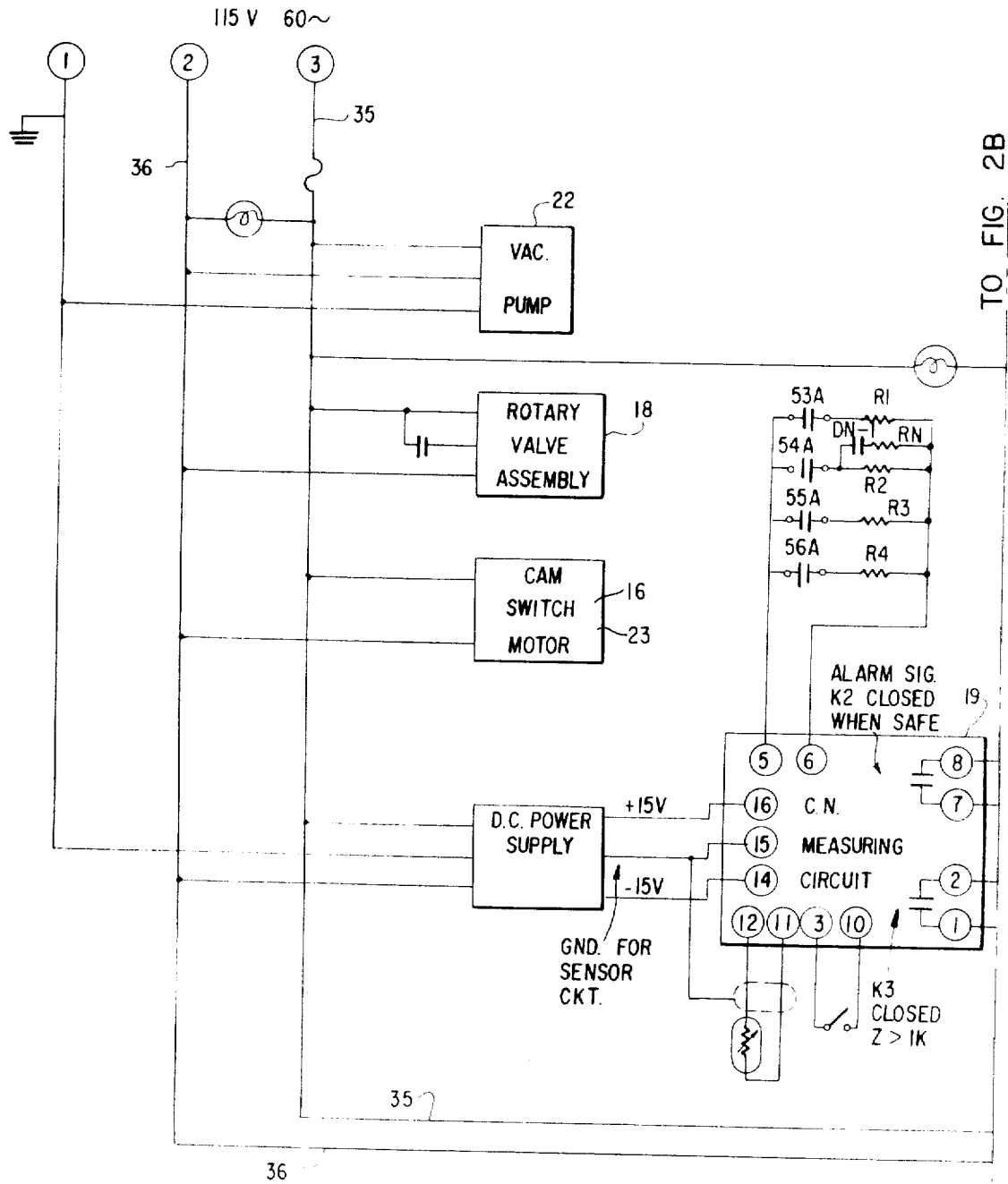
FIG. 2A is a detailed electrical circuit diagram showing the construction of a part of one embodiment of the invention.
Figure 2B:
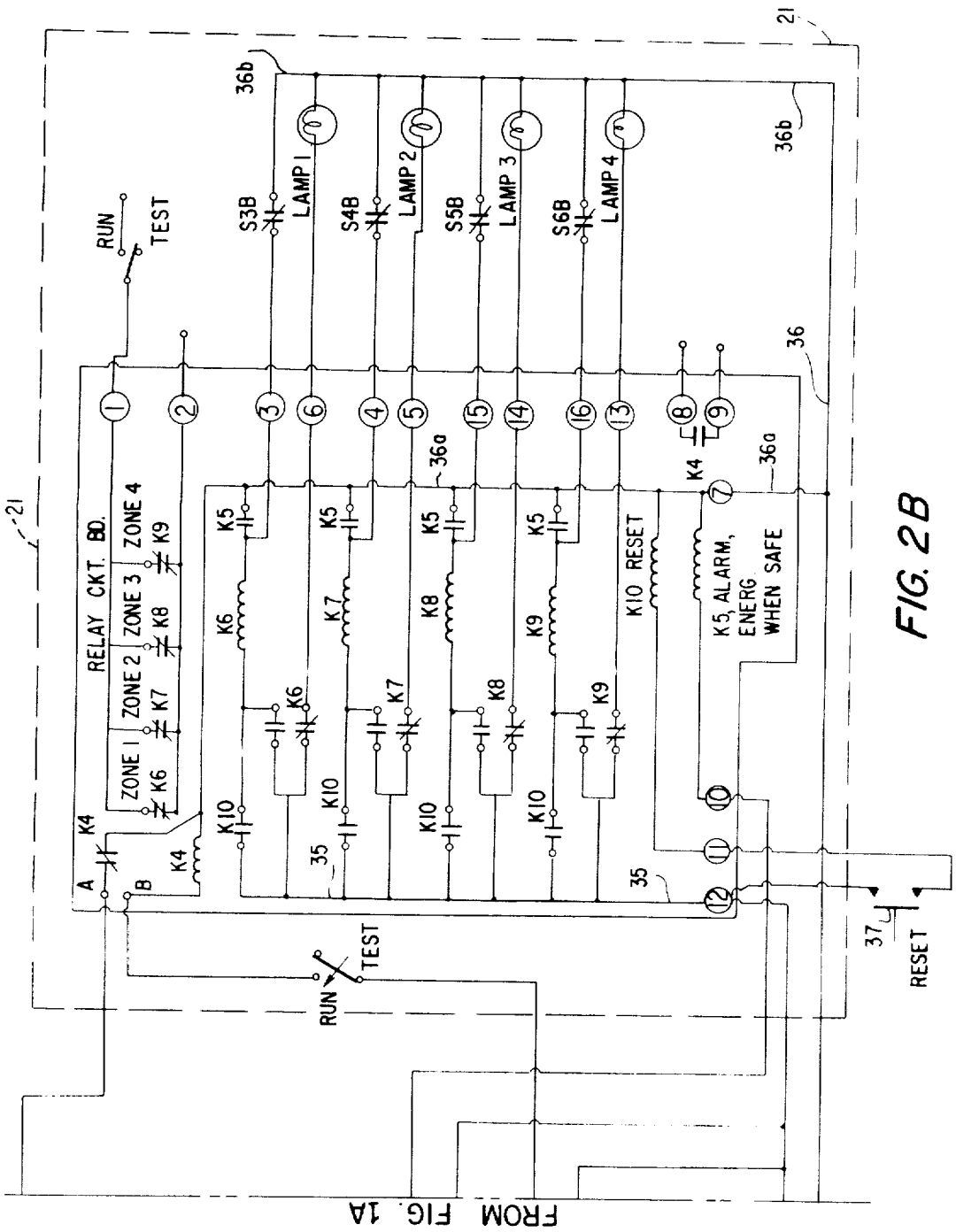
FIG. 2B is a detailed electrical circuit diagram showing the construction of the remaining portion of the embodiment of the invention shown in FIG. 1.

FIG. 2 is a detailed schematic circuit diagram showing the construction of the alarm and malfunction relay circuitry and its relation to the condensation nuclei measuring circuit 19. As stated above the details of the condensation nuclei detector and the measuring circuit 19 are disclosed more fully in US patent number 2,684,008 and in copending Skala application Ser. No. 113,561 filed February 8, 1971 filed concurrently herewith, and for a detailed description of the construction and operation of the CN measuring circuit 19, reference is made to this copending application. Briefly, however, the CN measuring circuit is excited from a direct current power supply 31 that in turn derives its power from a source of conventional 115 volt, 60 cycle, 15 amp residential or commercial alternating current power supply. The same a.c. supply also excites the vacuum pump 22 for periodically evacuating or expanding the cloud chamber of the condensation nuclei detector in a well known manner, the rotary valve assembly 16 and cam switch motor 23. Since the rotary valve assembly 16 and cam switch motor 23 are excited from the same power source, they will be operated in synchronism. In operation, the rotary valve assembly 16 sequentially and automatically supplies samples of the atmospheres of each of the zones 1–4 being monitored to the cloud chamber of the condensation nuclei detector where it is humidified and expanded. Condensation nuclei particles present in the sample produce a cloud of water droplets which in turn produce an attenuation effect on a light beam. This results in modulating the light signal impinging upon a photo cell detector shown at 33 in a well known manner. The photo cell detector 33 converts the light modulated signal into an electric signal representative of the particle concentration of the condensation nuclei particles present in the sample atmospheres of each of the zones. This electric output signal then is amplified selectively in accordance with the background conditions of the zone being monitored, and supplied to an output signal level sensing a particle count present in any of the sample atmospheres above predetermined reference level, as described more fully in the above referenced copending Skala application Ser. No. 113,561 filed Feb. 8, 1971.

As each zone is monitored, the sensitivity of the CN measuring circuit is adjusted for the particular background conditions existing in the zones sequentially and synchronously with the sampling of the atmospheres from each of the zones by the rotary valve assembly. For this purpose, the rotary valve assembly 16 and cam switch motor 23 are operated synchronously so that as the rotary valve assembly 16 supplies a sample atmosphere for one of the zones (for example zone 1) the cam switch motor 23 simultaneously closes a cam operated switch(S3A) for adjusting the sensitivity of the CN measuring circuit 19 to correspond to the background conditions existing in that zone. In the example cited, the cam operated switch contacts S3A are closed so as to connect a feedback resistor R1 in the feedback path of an operational amplifier included in the CN measuring circuit 19 to thereby adjust the gain of the CN measuring circuit 19 to correspond to the background conditions existing in zone 1. In a similar manner, cam operated switch contacts S4A, S5A and S6A connect in the different value resistors R2, R3 or R4 selectively for adjusting the gain of the output amplifier in accordance with the background conditions for zones 2–4.

In addition to the above described feature, a second set of contacts shown as DN-1 selectively are closed by operation of the time actuated day-night range change circuit 24 shown in FIG. 1. This further adjusts the gain of the output amplifier in CN measuring circuit 19 to the different conditions existing at nighttime for the zone 2 area. For example, if zone 2 is a manufacturing area, then the presence of a large number of people (some of whom may be smoking cigarettes) in the manufacturing facility during the daytime would require that the gain of the amplifier be adjusted to a relatively low value during the daytime. However, at night it would be desirable to increase the gain of the output amplifier to a correspondingly higher level due to absence of the human activity during the night interval. The DN-1 contact and associated RN resistor allows for this day and night adjustment for differing conditions in zone 2. Similar arrangements can be made for any other of the zones where different activities are involved during different time periods of the day.

In addition to selectively adjusting the gain of the CN measuring circuit 19 in accordance with the zone being sampled, the cam actuated switch arrangement also operates selectively to open one of the normally closed contacts of a plurality of switches S3B–S6B in the alarm and malfunction relay circuitry 21. The function of the cam actuated normally closed contacts S3B–S6B will become more apparent in the light of the following description of the alarm and malfunction relay circuitry 21.

Under normal conditions in all of the zones where normal background particle count signals are derived and do not exceed the alarm level, the switch contacts K2 of a level sensing relay in the CN measuring circuit 19 will be maintained closed. Under these conditions, the K5 solenoid winding in relay circuitry 21 will be energized causing all of the K5 contacts to be closed. The alarm and malfunction relay circuitry is energized from a pair of a.c. power supply terminals 35 and 36 connected through suitable fusing and master on-off switch (not shown) with the terminal 36 being split into a pair of branch power supply terminals 36a and 36b. Under normal, non-alarm conditions with the K2 contacts closed in CN measuring circuit 19, the K5 solenoid winding will be connected directly across power supply terminals 35 and 36A so as to cause all of the K5 contacts to be maintained closed under these conditions. The K5 contacts are connected in series circuit relationship with respective ones of the solenoid windings K6–K9 and the K10 contacts of a reset relay whose actuating winding is connected directly between the power supply terminals 35 and 36A through a reset button 37. Thus, under non-alarm normal conditions with the K2 and K5 contacts closed as described previously above, closure of the reset push button switch 37 will excite the K10 reset solenoid winding causing the K10 contacts to be closed thereby energizing all of the K6–K9 solenoid windings.

Each of the K6–K9 relays has two sets of normally closed contacts and one set of normally open contacts (normally-open or normally-closed in the non-erngized condition) so that upon being energized, the normally open contacts will be closed and the normally closed contacts will be opened. Thus, it will be seen that in the case of the K6 relay (which is assumed to represent zone 1) the normally open K6 contacts will be closed and will establish a holding circuit between the power supply terminals 35 and 36A, through the now "-closed" normally-open K6 contacts, the K6 winding and the closed K5 contact due to the continued energization of the K5 winding through the K2 contacts in the CN measuring circuit 19. Similar holding circuits can be traced through for each of the remaining zones 2–4 represented by windings K7–K9 respectively.

An alarm condition in any one of the zones being monitored is signaled by turn-on of one of the signal lamps 1–4 mounted on a suitable monitoring panel at a central control station. The lamps 1–4 are connected in series circuit relationship between the power supply terminals 36B and 35 through the normally-closed contacts K6–K9, respectively, which in the energized condition of the K6–K9 relay will be maintained open. Thus, under normal, non-alarm conditions the lamps are not lighted. The cam actuated switch contacts S3B–S6B are connected between the power supply terminal 36b and the juncture of the K6–K9 relay windings with their respective associated K5 contacts. The cam actuated switch contacts S3B–S6B are maintained normally closed but are selectively opened sequentially with the supply of a sample atmosphere from the zone they are associated with to the cloud chamber of the condensation nuclei detector.

With the above described arrangement, should an alarm condition be detected due to an excessive concentration of condensation nuclei particles, the K2 contacts in the CN measuring circuit 19 will open. As a consequence, the K5 relay winding is deenergized thereby allowing all of the K5 contacts to open. Upon this occurrence (assuming zone 1 is being sampled), the remaining solenoid windings K7–K9 will continue to be energized through the normally-closed cam actuated switch contacts S4B–S6B despite the fact that there associated K5 contacts have opened. However, in the case of the zone being sampled (in this case zone 1), its normally closed contacts will be open due to the cam actuation at the time of sampling. As a consequence, the K6 relay winding will drop out, allowing its normally-open K6 contact to open, and its normally-closed K6 contacts to close. This in turn lights lamp 1 thereby indicating to the monitoring station that an alarm condition exists in zone 1.

In addition to the local indication of the alarm condition due to lighting lamp 1, a parallel connected array of normally closed contacts K6–K9 shown in the upper portion of alarm and malfunction relay circuitry 21 will cause an output indication of the alarm condition to be supplied over an additional set of output lines. This additional output indication can be used to actuate remote indicating equipment, an alarm in a local fire department, a dial telephone message, or to actuate some other similar apparatus indicative of the existence of the detected alarm condition. Because of the parallel connection of the relay contacts, the remote indication will not identify in which zone the alarm condition exists, but will only be indicative of an alarm condition existing in one of the zones of the overall facility being monitored. Further, from the above description, it will be appreciated that the alarm circuitry is connected in a fail-safe manner. That is to say, the alarm relays must be energized to be in a safe (normal), non-alarm condition. Thus, in the event of a component failure, burn-out, or the like, an alarm condition will be signaled indicating that the equipment must be checked.

In addition to the alarm relay circuitry, malfunction relay circuitry is provided for indicating the existence of a power failure, failure of the condensation nuclei detector due to low water in the humidifier, or some similar condition. For this purpose, a K4 relay winding is connected between power supply terminals 36a and 35 through the normally open K3 contacts of a minimum signal level sensing relay also included in the CN measuring circuit 19. The K3 contacts of the minimum signal level sensing relay in CN measuring circuit 19 will be maintained closed for so long as the particle count derived by the condensation nuclei detector remains above a reference, minimum level. It is well established, that regardless of how clean a room or area is, there will always be some predetermined number of condensation nuclei particles present in the atmosphere of the room. The presence of these normal, background levels of condensation nuclei particles can be used to signal the existence of a malfunction condition. Accordingly, where the particle count signal from the output of the condensation nuclei detector drops below this minimum particle count level, the K3 contacts will be caused to open. This in turn deenergizes the K4 winding resulting in the closing of a set of normally-closed K4 contacts that connect a malfunction lamp directly across power supply terminals 35 and 36A. In addition, a set of normally open K4 contacts shown at the bottom of the alarm and malfunction relay circuitry 21 will be opened causing a remote indication of the malfunction condition to be transmitted to a remote indicating station.

From the foregoing description, it will be appreciated that the present invention provides a new and improved multi-zone incipient or actual fire and dangerous gas detection system. The system readily can be adapted to detect either incipient or actual fire and/or dangerous gas accumulations above a certain safe level, and to signal the existence of such alarm conditions to a central monitoring point as well as remotely signaling to a local fire department, security agency or the like. The system employs a single, common, highly sensitive condensation nuclei particle detector as a sensor which sequentially is switched to monitor the atmosphere of the several zones of a multi-zone facility being protected. This is accomplished through the medium of a relatively low cost piping system and sequentially operated selector valve assembly used to gather atmospheric samples automatically from each of the zones being monitored, and to supply the sample atmospheres sequentially to the common CN detector. Dynamic adjustment for different background levels of activity in the several zones being monitored is provided for by adjusting the sensitivity of the CN detector synchronously with the switching of the detector to monitor the several zones of the facility being protected. In addition, the detecting system employs a continuously operating sample system which samples atmospheres from the several zones selectively on-the-fly so as to provide a relatively fast response to the occurrence of an alarm condition in any of the zones being monitored. The entire system requires very little power drain and if need be can be operated from standby battery power sources and converters during periods of emergency power failure.

Having described one embodiment of a new and improved multi-zone incipient or actual fire and/or dangerous gas detection system constructed in accordance with the invention, other modifications and variations of the invention will be suggested to those skilled in the art in the light of the above teachings. It is therefor to be understood that changes may be made in the particular embodiments of the invention described which are within the fully intended scope of the invention as defined by the appended claims.

What is claimed is:

1. A multi-zone detecting system comprising a multi-zone sampling system for obtaining samples of the atmosphere of the respective zones being monitored and supplying the same to a common sampling station, a common detector located at the common detection station for detecting the existence of an alarm condition in any of the zones and deriving an output indication of the alarm condition, selective supply means coupled to the multi-zone sampling system and to the common detector for sequentially supplying the samples from the respective zones to the common detector, and sensitivity adjusting means coupled to the common detector as it is sequentially switched from one zone to the next whereby the response of the detector is individually adjusted to background conditions existing in each zone being monitored.

2. A multi-zone detecting system according to claim 1 further including means for desensitizing the common detector for a pre-determined settling time during each sequential switching of the input to the common detector whereby a short time interval settling period is provided prior to monitoring the samples from each of the zones.

3. A multi-zone detecting system according to claim 1 wherein the common detector comprises a condensation nuclei detector for detecting condensation nuclei particles present in the atmospheres of the respective zones being monitored and for deriving an output indication of the presence of condensation nuclei particles in excess of a given background amount.

4. A multi-zone detecting system according to claim 3 further including gas conversion means interposed in the input to the condensation nuclei detector for converting dangerous gases entrained in the sample atmospheres from the several zones into condensation nuclei for supply to the condensation nuclei detector.

5. A multi-zone detecting system according to claim 1 further including time-controlled sensitivity adjusting means for further adjusting the sensitivity of the common detector in accordance with a predetermined timed program whereby compensation can be provided for different background conditions at different times such as different day and night operations in the zones being monitored.

6. A multi-zone detecting system according to claim 1 wherein the selective supply means comprises continuous flow supply means for providing a continuous flow of the sample atmospheres from the respective zones being monitored, and selector valve means operable in conjunction with the continuous flow supply means for sequentially selecting on-the-fly from the continuous flowing streams samples of the atmospheres from the respective zones for supply to the common detector whereby response of the overall detecting system to an alarm condition is speeded up.

7. A multi-zone detecting system according to claim 6 wherein said selector valve means is a multiple input port rotary selector valve having a common output port and is located at the common sampling station input valve and includes individually flow adjusting means for each of the input ports whereby the continuous flow of sample atmosphere from the respective zones being monitored can be individually adjusted to compensate for differences in length of flow path and the like to thereby balance flow of the sample atmospheres to the common detector.

8. A multi-zone detecting system according to claim 7 wherein the design of the selector valve means readily can be modified to accommodate different sampling periods, multiple sampling of particular zones and the like in accordance with the requirements of a particular multi-zone installation to be monitored.

9. A multi-zone detecting system according to claim 8 further including means for desensitizing the common detector for a pre-determined settling time during each sequential switching of the input to the common detector whereby a short time interval settling period is provided prior to monitoring the sample from each of the zones.

10. A multi-zone detecting system according to claim 9 wherein the common detector comprises a condensation nuclei detector for detecting condensation nuclei particles present in the atmospheres of the respective zones being monitored and for deriving an output signal indicative of the presence of condensation nuclei particles in excess of a given background amount, said condensation nuclei detector having output signal amplifying means for amplifying the output signal and wherein said sensitivity adjusting means comprises gain change circuit means coupled to the output signal amplifying means for changing the gain of the output signal amplifying means synchronously with the switching of the zones being monitored whereby the sensitivity of the detecting system is individually adjusted to background conditions existing in each zone being monitored.

11. A multi-zone detecting system according to claim 10 further including gas conversion means selectively connectable to the input of the condensation nuclei detector for converting dangerous gases entrained in the sample atmospheres selectively supplied from the several zones into condensation nuclei for measurements.

12. A multi-zone detecting system according to claim 10 further including time controlled sensitivity adjusting means for further adjusting the sensitivity of the output amplifying means in accordance with a predetermined time program whereby compensation can be provided for different background conditions at different times such as different day and night operations in the zones being monitored.

13. A multi-zone detecting system according to claim 10 further including flow sensing means disposed in the respective paths of the sampling system for sensing the respective flow rates and deriving output control signal in accordance therewith, and means supplying the respective control signals to the alarm circuitry to signal the existence of a malfunction where the flow rates drop below predetermined values.

14. A multi-zone detecting system according to claim 10 wherein the means for desensitizing the common detector for a predetermined interval of time during each sequential switching of the common detector to sample the respective zones being monitored comprises cam operated switch means operated synchronously with rotary selector valve for deriving a desensitizing electric signal that is applied to the common detector to render it unresponsive to alarm conditions for a predetermined settling interval following each switching operation by the rotary selector valve.

15. A multi-zone detecting system according to claim 14 further including fail-safe relay operated indicating means for each of the several zones being monitored by the detecting system and responsive to the output signal from the output signal amplifying means of the condensation nuclei detector for indicating the existence of an alarm condition in any of the zones being monitored in fail-safe manner.

16. A multi-zone detecting system according to claim 15 further including fail-safe malfunction indicating means responsive to the output of the condensation nuclei detector means for indicating the existence of a malfunction in a fail-safe manner upon the output from the condensation nuclei detector means dropping below a predetermined minimum reference level.

17. A multi-zone detecting system according to claim 1 further including fail-safe malfunction indicating means responsive to the output from the common detector for indicating the existence of a malfunction condition in any of the zones being monitored in a fail-safe manner upon the output from the common detector dropping below a predetermined minimum reference level.

18. A multi-zone detecting system according to claim 1 further including flow sensing means disposed in the respective paths of the sampling system for sensing the respective flow rates and deriving output control signals representative of the respective flow rates, and means supplying the respective control signals to the common detector for adjusting the sensitivity of the common detector in accordance with the flow rate of the sample atmosphere supplied from the respective zones.

19. A multi-zone detecting system according to claim 1 further including fail-safe relay operated indicating means for each of the several zones being monitored by the detecting system and responsive to the output from the common detector for indicating the existence of an alarm condition in any of the zones being monitored in a fail-safe manner, fail-safe malfunction detector means responsive to the output from the common detector means for indicating the existence of a malfunction condition in the detecting system in a fail-safe manner, and wherein the common detector and indicating arrangement have relatively small electric power requirements whereby the entire system can be operated on standby battery power during emergency periods of power failure.

20. A method of monitoring a plurality of different zones for the detection of incipient or actual fires and/or dangerous gas accumulation comprising sequentially supplying a sample of the atmosphere in each zone being monitored to a common measuring station, measuring each sample sequentially at the common measurement station to detect and signal the existence of an alarm condition in any of the zones being monitored, and adjusting the sensitivity of each sample measurement sequentially in synchronization with the supply of sample atmospheres as measurement is switched from one zone to another in accordance with the individual background conditions existing in each zone being monitored.

21. A method according to claim 20 further including desensitizing the sample measurement for a short duration settling period following each sequential switching of a sample atmosphere from one zone being monitored to the next.

22. A method according to claim 21 wherein the sample measurement is obtained by deriving a measurement of the condensation nuclei particle concentration present in the sample gaseous atmosphere of each zone being monitored.

23. A method according to claim 22 further including converting gaseous contituents entrained in the atmosphere of the zones being monitored into condensation nuclei particles whose concentration is representative of the proportion of the gaseous contituents present in the atmosphere and then measuring the condensation nuclei particle concentration as an indication of the proportion of gaseous constituents entrained in the sample atmosphere.

24. A method according to claim 20 further including adjusting the sensitivity of the sample measurement in accordance with the time of day and the nature of operations being conducted in the respective zones being monitored where such operations change in accordance with the time of day.

25. A method according to claim 20 wherein sample atmospheres from all of the zones being monitored are continuously drawn from each of the respective zones and supplied to the common sample measurement station where the respective sample atmospheres are sequentially accessed on-the-fly and measured in a predetermined sequential order whereby the response time of the monitoring method to an alarm condition is greatly improved.

26. A method according to claim 25 further comprising separately adjusting the flow rate of the respective sample atmospheres to the measuring operation in order to balance the flow rates and improve response of the measurement only to changes in conditions in the zones being monitored.

27. A method according to claim 26 wherein the sampling rate and/or the duration of sampling of certain zones is different due to the different nature of the zones being monitored.

28. A method according to claim 25 further including desensitizing the sample measurement for a short duration settling period following each sequential switching of a sample atmosphere from one zone being monitored to the next.

29. A method according to claim 28 wherein the sample measurement is obtained by deriving a measurement of the condensation nuclei particle concentration present in the sample gaseous atmosphere of each zone being monitored.

30. A method according to claim 29 further including converting certain gaseous constituents entrained in the atmosphere of the zones being monitored into condensation nuclei particles whose concentration is representative of the proportion of the gaseous constituents present in the atmosphere and then measuring the condensation nuclei particle concentration as an indication of the proportion of the gaseous constituents entrained in the sample atmospheres.

31. A method according to claim 29 further including adjusting the sensitivity of the sample measurements in accordance with the time of day and the nature of operations being conducted in the respective zones being monitored where such operation change in accordance with the time of day.

32. A method according to claim 29 further including measuring the output from the condensation nuclei detector continuously and signaling the existence of a malfunction condition upon the output dropping below a predetermined minimum level.

33. A method according to claim 29 further including indicating the existence of an alarm condition in any of the zones being monitored or a malfunction in a fail-safe manner whereby upon the occurrence of a power failure, malfunction or the like an output alarm is indicated.

34. A method according to claim 20 further including sensing the flow rate of the sample atmospheres from the different zones being monitored and signalling a malfunction condition where the flow rate falls below a predetermined standard.

* * * * *